Patented Apr. 7, 1925.

1,533,060

UNITED STATES PATENT OFFICE.

IRWIN ARTHUR CLARK, OF PARCO, WYOMING, ASSIGNOR TO PRODUCERS AND REFINERS CORPORATION, A CORPORATION OF WYOMING.

METHOD OF TREATING OILS WITH PREPARED CLAYS.

No Drawing.   Application filed November 11, 1924.   Serial No. 749,251.

*To all whom it may concern:*

Be it known that I, IRWIN A. CLARK, a citizen of the United States, residing at Parco, in the county of Carbon and State of Wyoming, have invented certain new and useful Improvements in Method of Treating Oils with Prepared Clays, of which the following is a specification, reference being had therein to the accompanying drawings.

This invention relates to certain new improvements in methods of preparing clay for bleaching petroleum, animal and vegetable oils. The object of this method is to improve and increase the decolorizing and deacidifying properties of clay or similar substances when admixed with light or heavy mineral oils, animal oils, vegetable oils, waxes or fats without the use of acids or other expensive chemicals.

In this invention the term clay is used in a broad sense to include those natural substances such as diatomaceous earth, kaolinite and other members of the kaolin division such as halloysite, newtonite, cimolite, montmorillonite, pyrophyllite, and so forth; the various types of fuller's earth; clay-like rocks such as bentonite, and other substances of volcanic origin, e. g., altered volcanic ashes, tuffs or volcanic breccias or pyroclasts; clay or gouge minerals such as leverrierite, etc.

In the past the better known processes for producing a decolorizing material have involved the use of a mineral acid, usually sulphuric or hydrochloric, for removing or altering the acid soluble constituents of the clay. In the methods proposed from 5% to 50% by weight of acid to that of clay is used, and the processes involve either removing the salts of reaction by washing with water, or allowing these salts to remain in the clay and either drying and pulverizing the same, or removing the excess moisture and maintaining the treated material in a mudded condition for intermixture with the oil. These finished products possess varying adsorptive properties and have proved successful in decolorizing, neutralizing, and otherwise purifying oils.

However, the large amount of acid required to cause a marked increase in the decolorizing properties of the clay make this process very expensive. If the salts of reaction are removed from the clay by washing there is a large loss of weight; while if these salts are allowed to remain in the clay its decolorizing properties are increased but little, if any. In either process there is a large consumption of acid.

I have found by extensive experimentation that the decolorizing and deacidifying efficiency of a clay is greatly increased by washing the clay with water and removing the excess moisture, or by the addition of water up to 500% by weight of water to that of clay, and maintaining the clay in a mudded condition until applied to the oil to be treated.

The advantage of my new and improved process lies in the fact that no acids of any kind are used and the decolorizing value of the clay is greatly increased by a simple and inexpensive treatment. The clay may be washed with water with very little loss in weight as compared to the large losses incurred in the washing of highly acid treated clays. Washing increases the efficiency of some clays; although the washing out process is not always necessary or advisable. The loss of weight in washing the clay with water is small; on the other hand, it is evident that no loss whatsoever takes place when the water is added direct to the clay in the proportions desired.

It has long been known in the art that the adsorptive powers of clays are dependent, primarily, upon their internal structure. Upon examination under the ultramicroscope and in polarized light it has been found that those clays possessing high adsorptive values have a very fine microstructure; in fact, the particles themselves are honeycombed by innumerable microscopic canals that bring about an enormous increase in the adsorptive surface. In many of the natural occurring clays and clay minerals, these pores are clogged with various impurities consisting mostly of acid and water soluble salts, such as carbonates, sulphates and chlorides. I have found by experiment on the clays that have come under my examination, particularly from the results of the tests on those clays found in the Rocky Mountain region, that a large proportion of these impurities are water soluble and therefore removable by washing. Since the adsorptive capacity of a clay is dependent upon the adsorptive surface exposed, it is evident that the removal of these water soluble constituents from the microscopic channels enormously increases the adsorptive surface, and, therefore, the adsorptive power of the clay.

Furthermore, the majority of those clays possessing decolorizing value are composed largely of crystalline silicates. Colloidal silica and silicates have a more porous structure than the same substances in crystalline form. Washing or soaking the clay in hot or cold water, preferably luke-warm water, for various periods of time tends to convert the crystalline silicates to the colloidal or amorphous form, thereby greatly increasing the adsorptive power of the clay so treated.

Finely pulverized filtering materials upon exposure to the atmosphere rapidly adsorb gases and other impurities from the air. The adsorbed fumes and gases not only fill the pores of the clay but have a detrimental oxidizing effect upon their internal structure. Washing or soaking the clay in hot or cold water not only clears these pores of gaseous impurities but keeps them open until such time as the clay is applied to the oil.

The process I prefer to employ is as follows: the clay or other substance is pulverized and if not sufficiently dry to pulverize readily is previously dried, or partially so. In the case of those clays which disintegrate in water drying and pulverizing may be omitted. The clay is then mixed with an excess of hot or cold water and after mixing the excess water is removed leaving from 30% to 500% by weight of water to clay in the finished product. This mixing with water, and subsequent removal of the excess water, is repeated as many times as is necessary for the removal of impurities.

As an alternative process to the one above described I may eliminate the washing process and add from 30% to 500% by weight of hot or cold water to the clay. I may use this mixture immediately in treating oils, or allow it to stand either hot or cold for such a period of time as will bring the product to its maximum efficiency.

The plastic mixture is then added to the oil to be treated and heat applied to the oil and clay mixture to drive off the water and bring about the decolorizing, deacidifying and purifying action of the clay. The treatment of the oil with the clay should be done at a temperature that would insure the driving off of the water from the clay which would be in excess of the boiling point of water and maintained at, or above, such a temperature until the reaction is complete.

What I claim and desire to secure by Letters Patent is:

1. A process of treating light and heavy mineral oils, animal and vegetable oils, waxes and fats and similar substances, which consists in mixing a filtering material with the amount of water that will form a mudded mass, without the use of acid of any kind, and intermixing the said mass with the oil to be treated.

2. The herein described step in the treatment of petroleum oils to decolorize and purify the same which consists of washing clay with water and reducing it to a mudded mass without subject it to acid of any kind, mixing the oil to be treated with said mudded mass and then heating the mixture to a point above the boiling point of water to drive off said water.

3. The herein described treatment of petroleum oils which consists of washing clay with an excess of water and reducing it to a mudded mass without the use of acid of any kind, removing the excess water to leave a mudded mass and mixing the oils to be treated with the mudded mass.

In testimony whereof I hereunto affix my signature.

IRWIN ARTHUR CLARK.